(12) United States Patent
Brennan et al.

(10) Patent No.: US 6,728,778 B1
(45) Date of Patent: Apr. 27, 2004

(54) LAN SWITCH WITH COMPRESSED PACKET STORAGE

(75) Inventors: Walter Brennan, Sacramento, CA (US); Lawrence Lomelino, Folsom, CA (US); Jim Muth, Newport Beach, CA (US)

(73) Assignee: Intel Corporation, Santa Clara, CA (US)

( * ) Notice: Subject to any disclaimer, the term of this patent is extended or adjusted under 35 U.S.C. 154(b) by 563 days.

(21) Appl. No.: 09/609,564

(22) Filed: Jun. 30, 2000

(51) Int. Cl.[7] .............................................. G06F 13/00
(52) U.S. Cl. ....................... 709/238; 709/247; 709/249; 370/395.7; 370/401
(58) Field of Search ................................. 709/238, 247, 709/249, 250; 370/389, 392, 401, 395.7

(56) References Cited

U.S. PATENT DOCUMENTS

| 5,553,063 | A | * | 9/1996 | Dickson ....................... 370/29 |
|---|---|---|---|---|
| 5,758,256 | A | * | 5/1998 | Berry et al. .................. 455/72 |
| 5,991,305 | A | * | 11/1999 | Simmons et al. ........... 370/422 |
| 6,108,345 | A | * | 8/2000 | Zhang ......................... 370/445 |
| 6,542,497 | B1 | * | 4/2003 | Curry et al. ................. 370/352 |

* cited by examiner

Primary Examiner—Viet D. Vu
(74) Attorney, Agent, or Firm—Fish & Richardson P.C.

(57) ABSTRACT

A compressed switch data storage for a network system is disclosed. The system includes a plurality of network channels to transfer data, and devices coupled to the plurality of network channels. The devices provide or receive data. The system also includes a switch. The switch has a memory for storing compress data, and a plurality of ports coupled to the plurality of network channels. The switch routes data from one port to another port according to a destination port address.

13 Claims, 3 Drawing Sheets

LAN SWITCH WITH COMPRESSED PACKET STORAGE

BACKGROUND

The present disclosure generally relates to network switching and more specifically, to compressed data storage in network switching.

Networking allows computers to share resources, access information, communicate via e-mail, share data, and transfer files. However, networking technology and digital data transmission have been subject to a number of bandwidth and speed limitations due to a growing population of network users. Other factors that contribute to congestion include faster CPUs, faster operating systems, and more network-intensive applications.

Switching alleviates congestion in networks such as the Local Area Network (LAN) by reducing traffic and increasing bandwidth. The term switching refers to a technology in which a device, referred to as a switch, connects two or more network segments. A switch receives a packet of data from one segment, examines the embedded address information, and transmits the data packet to designated destinations on other segments.

The received data packet is often stored for a short period of time before being forwarded to the destination. The storage area is referred to as a packet buffer or packet data memory.

BRIEF DESCRIPTION OF THE DRAWINGS

Different aspects of the disclosure will be described in reference to the accompanying drawings wherein.

DETAILED DESCRIPTION

A Local Area Network (LAN) system often provides information exchange over shorter distances than a Wide Area Network (WAN) system. A LAN system may operate at higher speeds than the WAN system. Furthermore, hardware used in LAN systems is generally discrete, controlled, and homogeneous, which provides an advantageous environment for high-speed operation. Therefore, data packets in a LAN system are transmitted in an uncompressed format.

Accordingly, packets are stored in the buffer area in an uncompressed format. However, the memory buffer may need to be relatively large in size to store the uncompressed data packets.

Figure 1:
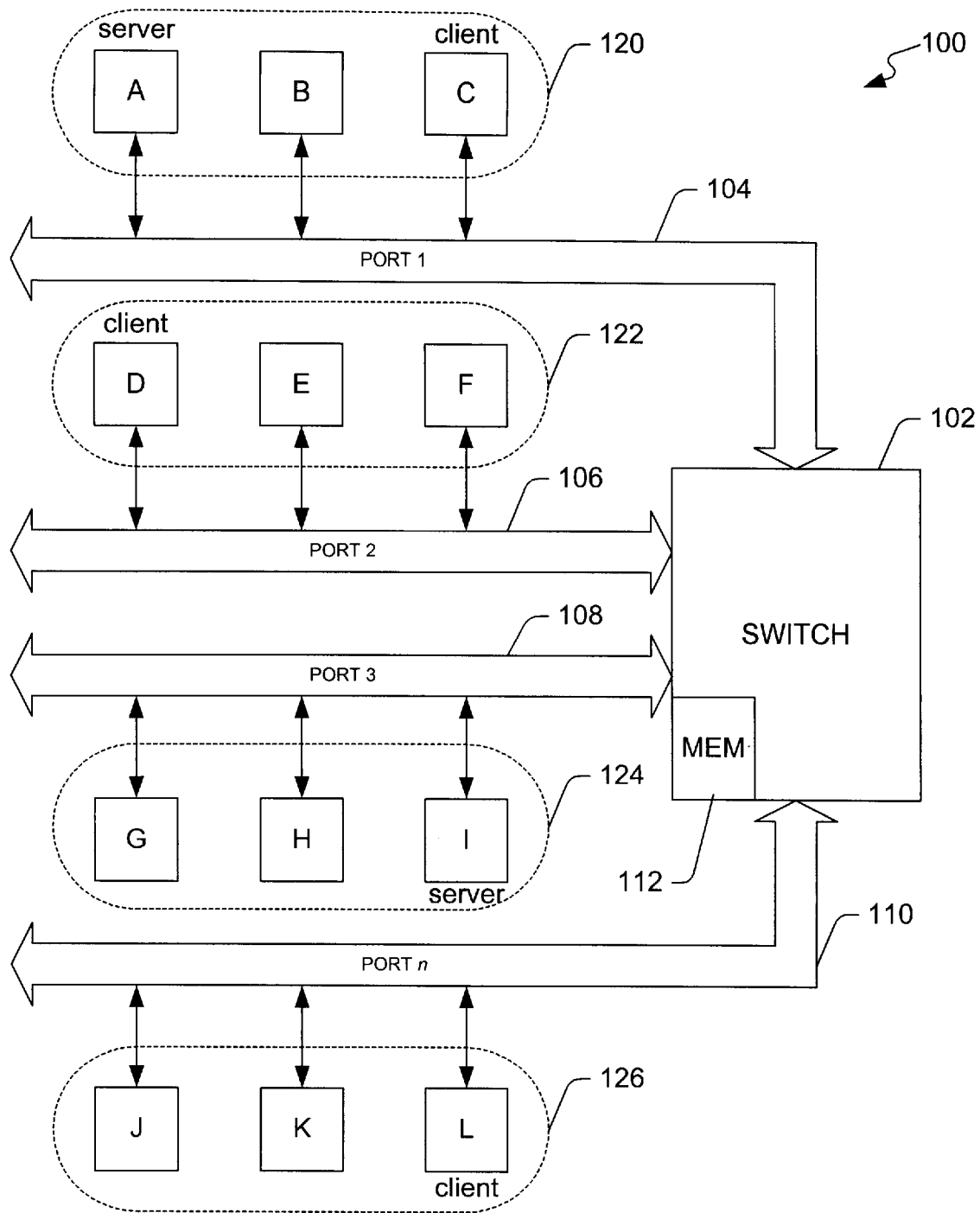
FIG. 1 illustrates a network system such as the LAN system in accordance with an embodiment.

FIG. 1 illustrates a network system such as the LAN system 100 in accordance with an embodiment. In the illustrated embodiment, the LAN system 100 includes a switch chip 102, a plurality of devices A through L, and a plurality of ports 104–110. The switch 102 includes memory 112 that may store the data packets in a compressed format. Compressing the data packets may reduce the amount of memory required for the packet buffer. The smaller memory size may enable the memory 112 to be embedded into the same die as the switch chip 102.

Each device on the LAN system 100 has a media access control (MAC) address, which uniquely identifies the device to the network. The device may be a computer, processor, printer or other peripherals capable of storing and exchanging information. The device may serve as a client or a server. The term "client" refers to a device's general role as a requester of data or services, and the term "server" refers to a device's role as a provider of data or services. The size of a computer, in terms of its storage capacity and processing capability, does not necessarily affect its ability to act as a client or server. Further, it is possible that a device may request data or services in one transaction and provide data or services in another transaction, thus changing its role from client to server or vice versa.

The data packets are delivered, and origination devices are recognized by MAC addresses on the packets. The switch 102, and each port 104–110 on the switch 102, supports a finite number of MAC addresses. However, the overall number of addresses for the switch 102 may be large, so that the switch 102 can support a large number of devices. In the illustrated embodiment of FIG. 1, the number of ports (n) may be large.

In FIG. 1, each LAN segment 120–126 is connected to a port 104–110 on the LAN switch chip 102. If server A on port #1 104 needs to transmit to client D on port #2 106, the LAN switch chip 102 forwards data packets from port #1 104 to port #2 106. Ports #3 108 through #n 110 may be isolated from the data traffic between port #1 and port #2.

If server I needs to send data to client L at the same time that server A sends data to client D, the server I may do so because the LAN switch chip 102 can forward data packets from port #3 108 to port #n 110 at the same time it is forwarding data packets from port #1 104 to port #2 106. If server A on port #1 104 needs to send data to client C, which is also on port #1 104, the LAN switch chip 102 does not need to forward any packets. Thus, the switch chip 102 alleviates data traffic congestion on the LAN. system. The switch chip 102 may also increase the bandwidth by simultaneously routing data between more than one pair of switch chip ports.

In some embodiments, the switch chip 102 may transfer compressed data packets internally. In other embodiments, the switch chip 102 may transfer compressed data packets along an extended system backplane before decompression and transmission to the destination port.

The memory 112 in the switch chip 102 is configurable to store the packet data in a specified configuration.

Figure 2A:
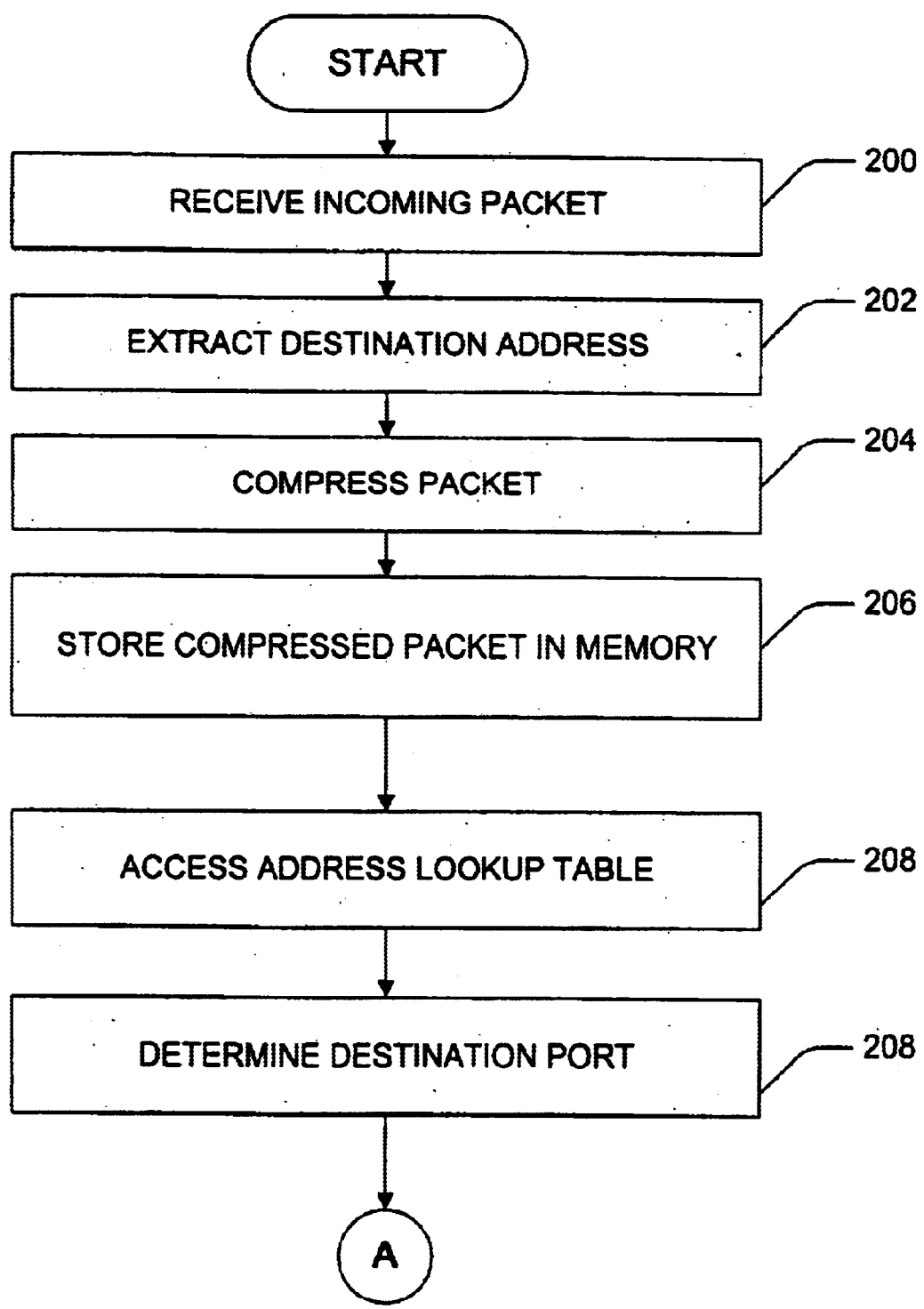
FIGS. 2A and 2B show a flowchart of a LAN switching process in accordance with an embodiment.
Figure 2B:
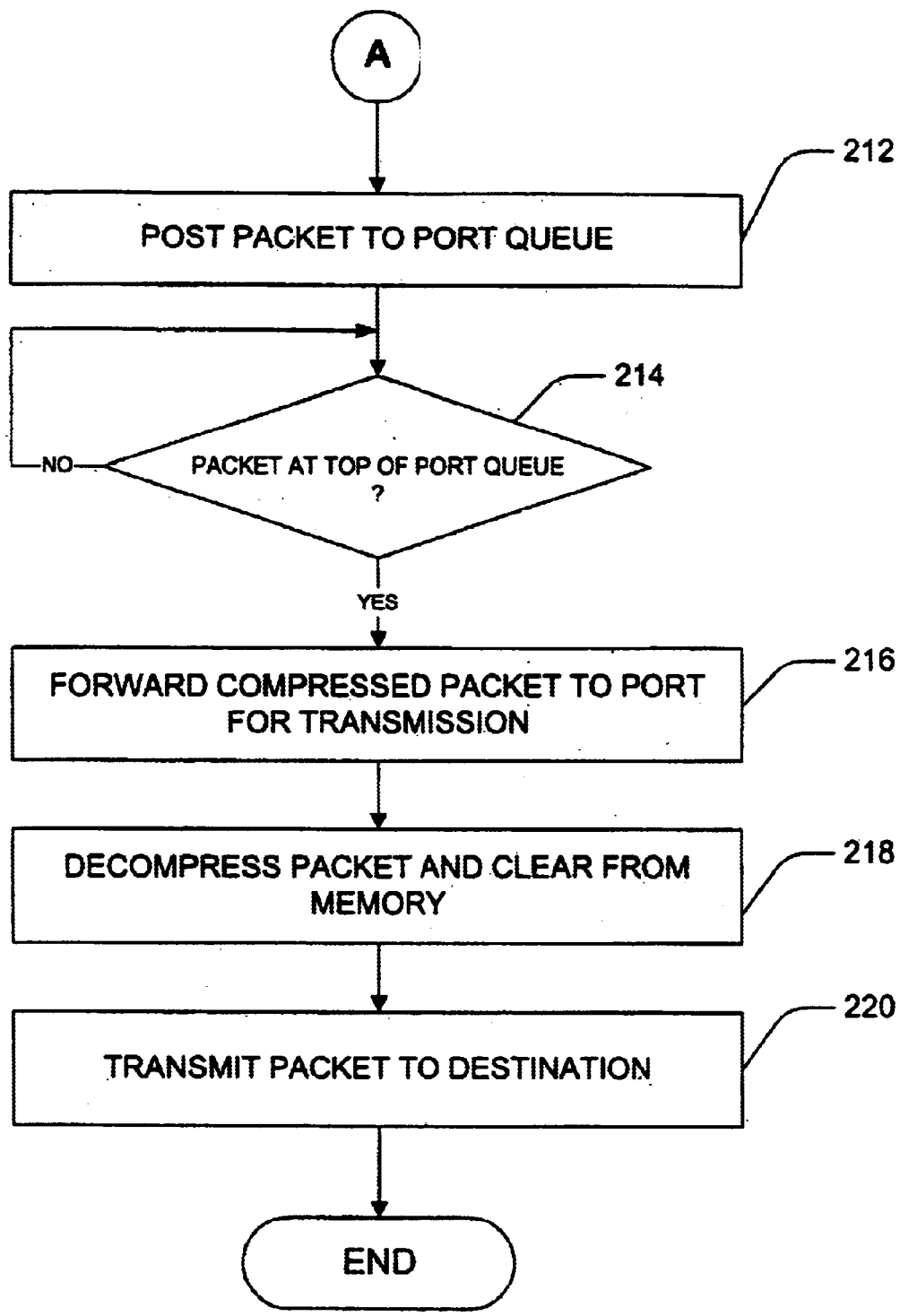

A flowchart of a LAN switching process in accordance with an embodiment is illustrated in FIGS. 2A and 2B. An incoming packet of data is received at 200. At 202, a destination MAC address may be extracted from the packet. The data packet is compressed at 204. The compressed data packet is stored in a packet memory at 206.

A lookup table in the memory is accessed at 208. The lookup table provides port addresses corresponding to the MAC addresses of the devices. A lookup engine searches the table to determine the switch.port corresponding to the destination MAC address at 210.

Once the corresponding port is identified, the packet is posted to the appropriate queue at 212. When the packet rises to the top of the queue at 214, the packet may be forwarded to the output port at 216. The packet may then be decompressed for transmission at 218 and cleared from memory. The decompressed data packet is transmitted to the destination address via the port address from the lookup table at 220.

The advantages of providing a LAN switch chip with a built-in memory having compressed packet data include low cost and decreased chip count. By storing the packet data in the switch chip, a need for external memory devices is reduced or eliminated. Further, the consolidation reduces the chip manufacturer's dependence on third party memory suppliers.

While specific embodiments of the invention have been illustrated and described, other embodiments and variations are possible. For example, although the switch configuration has been described in terms of an integrated switch chip with embedded memory, the system may be implemented with separate chips for switching fabric, memory and physical layer port interfaces.

All these are intended to be encompassed by the following claims.

What is claimed is:

1. A Local Area Network (LAN) switching system, comprising:
   a plurality of network channels to transfer data;
   devices coupled to said plurality of network channels, said devices providing or receiving data; and
   a switch including
      a plurality of ports coupled to said plurality of network channels, and
      a memory,
      where said switch is operative to
         receive a data packet including a destination address at a first one of said plurality of ports,
         compress the data packet,
         store the compressed data packet in the memory,
         route the compressed data packet to a second one of the plurality of ports,
         decompress the data packet, and
         transmit the decompressed data packet to the destination address.

2. The system of claim 1, wherein said switch is an integrated chip.

3. The system of claim 1, wherein said switch transfers compressed data packets internally or along an extended system backplane before decompression and transmission to the second port.

4. A local area network switch chip, comprising:
   a plurality of data ports arranged to connect to devices; and
   a switch including a memory and coupled to the plurality of ports, said switch being operative to
      receive a data packet including a destination address at a first one of said plurality of ports,
      compress the data packet,
      store the compressed data packet in the memory,
      route the compressed data packet to a second one of the plurality of ports,
      decompress the data packet, and
      transmit the data packet to the destination address.

5. The switch chip of claim 4, wherein each of said plurality of data ports is coupled to a device identified by a media access control (MAC) address.

6. A switch network system, comprising:
   a plurality of devices; and
   a switch having a plurality of ports coupled to said plurality of devices and operative to
      receive a data packet including a destination address at a first one of said plurality of ports,
      compress the data packet,
      store the compressed data packet in the memory,
      route the compressed data packet to a second one of the plurality of ports,
      decompress the data packet, and
      transmit the data packet to the destination address.

7. The system of claim 6, further comprising:
   a plurality of data channels coupled to said plurality of ports, where said plurality of data channels allow transfer of data packets between said plurality of devices after being routed through said switch.

8. The system of claim 6, wherein said plurality of devices include at least one server and at least one client.

9. A local area network switching method, comprising:
   receiving a packet of data including a destination device address at one of a plurality of ports;
   extracting the destination device address from the packet of data;
   compressing and storing the packet of data;
   determining a port address corresponding to the extracted destination device address;
   internally routing the packet of data to an appropriate port pointed to by the port address; and
   decompressing the packet of data before transmission.

10. The method of claim 9, wherein said determining the port address includes:
    sequentially matching the extracted destination device address with a selected device address in a table.

11. The method of claim 10, further including:
    selecting a port address corresponding to the selected device address that matches the extracted destination device address.

12. The method of claim 10, further including:
    compressing the extracted destination device address; and
    saving the compressed destination device address to the table, if no match is found.

13. The method of claim 9, wherein said routing the packet of data includes switching several packets of data between a plurality of port pairs.

* * * * *